(12) United States Patent
Kim et al.

(10) Patent No.: US 10,289,062 B2
(45) Date of Patent: May 14, 2019

(54) DEVELOPING CARTRIDGE, AND ELECTROPHOTOGRAPHIC IMAGE FORMING APPARATUS USING SAME

(71) Applicant: HP PRINTING KOREA CO., LTD., Suwon-si, Gyeonggi-do (KR)

(72) Inventors: Young Chae Kim, Suwon (KR); Junhui Kim, Suwon (KR); Jin-Hong Kim, Suwon (KR); Ji-Won Moon, Suwon (KR); Yun Kyu Shim, Suwon (KR); Sungwook Kang, Suwon (KR); Sunggi Kim, Suwon (KR)

(73) Assignee: HP PRINTING KOREA CO., LTD., Suwon-si (KR)

( * ) Notice: Subject to any disclaimer, the term of this patent is extended or adjusted under 35 U.S.C. 154(b) by 0 days.

(21) Appl. No.: 15/909,614

(22) Filed: Mar. 1, 2018

(65) Prior Publication Data

US 2018/0188682 A1 Jul. 5, 2018

Related U.S. Application Data

(63) Continuation of application No. PCT/KR2016/002753, filed on Mar. 18, 2016.

(30) Foreign Application Priority Data

Sep. 2, 2015 (KR) .......................... 10-2015-0124231

(51) Int. Cl.
*G03G 21/16* (2006.01)
*G03G 21/18* (2006.01)
(Continued)

(52) U.S. Cl.
CPC .............. *G03G 21/18* (2013.01); *G03G 9/08* (2013.01); *G03G 15/02* (2013.01); *G03G 15/06* (2013.01);
(Continued)

(58) Field of Classification Search
CPC .......... G03G 9/08; G03G 15/02; G03G 15/06; G03G 15/757; G03G 21/18; G03G 21/186;
(Continued)

(56) References Cited

U.S. PATENT DOCUMENTS 6,389,250 B1 * 5/2002 Numagami ........ G03G 15/0896
399/111
2003/0059233 A1 3/2003 Jang et al.
2004/0013446 A1 1/2004 Morioka et al.

FOREIGN PATENT DOCUMENTS

CN 1452032 10/2003
CN 101470377 7/2009
(Continued)

*Primary Examiner* — Hoang X Ngo
(74) *Attorney, Agent, or Firm* — Staas & Halsey LLP

(57) ABSTRACT

Disclosed is a development cartridge attachable/detachable to/from a main body of an image forming apparatus. The development cartridge includes at least a photosensitive drum to form an electrostatic latent image thereon or a developer roller to develop the electrostatic latent image by supplying a developer to the photosensitive drum, a housing to support the at least one photosensitive drum or the developer roller. A developer roller gear may be provided on a rotation shaft of the developer roller to connect to a driving gear of the main body when the development cartridge is attached to the main body, and a driven coupler provided at an end of the photosensitive drum to couple to a driving coupler located coaxially with the driving gear in the main body, based on shaft coupling when the development cartridge is attached to the main body.

15 Claims, 15 Drawing Sheets

(51) Int. Cl.
  *G03G 9/08* (2006.01)
  *G03G 15/02* (2006.01)
  *G03G 15/06* (2006.01)
  *G03G 15/00* (2006.01)
  *G03G 15/08* (2006.01)
  *F16H 7/02* (2006.01)

(52) U.S. Cl.
  CPC ....... *G03G 15/0806* (2013.01); *G03G 15/757* (2013.01); *G03G 21/1647* (2013.01); *G03G 21/186* (2013.01); *G03G 21/1864* (2013.01); *F16H 7/02* (2013.01)

(58) Field of Classification Search
  CPC ........... G03G 21/1647; G03G 21/1864; G03G 15/0806; F16H 7/02
  See application file for complete search history.

(56) References Cited

FOREIGN PATENT DOCUMENTS

| | | |
|---|---|---|
| JP | 2002278258 | 9/2002 |
| JP | 2003057998 | 2/2003 |
| JP | 2013164456 | 8/2013 |
| JP | 201416489 | 1/2014 |
| KR | 20030026641 | 4/2003 |
| KR | 102014006773 | 6/2014 |
| KR | 102015003913 | 4/2015 |

* cited by examiner

DEVELOPING CARTRIDGE, AND ELECTROPHOTOGRAPHIC IMAGE FORMING APPARATUS USING SAME

CROSS-REFERENCE TO RELATED APPLICATIONS

This application is continuation application of International Patent Application No. PCT/KR2016/002753, filed on Mar. 18, 2016, which claims the benefit of Korean Patent Application No. 10-2015-0124231, filed on Sep. 2, 2015, in the Korean Intellectual Property Office, the disclosure of which is incorporated herein in its entirety by reference.

BACKGROUND ART

An image forming apparatus using electrophotography forms a visible toner image on a photosensitive medium by supplying a toner to an electrostatic latent image formed on the photosensitive medium, transfers the toner image to a recording medium, and then fixes the transferred toner image on the recording medium, thereby printing an image on the recording medium.

A development cartridge is an assembly of parts for forming the visible toner image, is attachable/detachable to/from a main body of the image forming apparatus, and is replaceable when the life thereof is ended. The development cartridge includes a photosensitive medium and a developer roller configured to supply a toner to the photosensitive medium, and contains the toner to be supplied to the photosensitive medium. When the development cartridge is attached to the main body of the image forming apparatus, the photosensitive medium is connected to a driver provided in the main body. The photosensitive medium is connected to the developer roller based on a gear connection structure. As such, the photosensitive medium and the developer roller are driven.

Rotation uniformity of the photosensitive medium and the developer roller influences the quality of the printed image.

DETAILED DESCRIPTION

Technical Problem

Provided are development cartridges capable of stably rotating photosensitive media, and image forming apparatuses using the development cartridges.

Provided are development cartridges capable of stably rotating developer rollers, and image forming apparatuses using the development cartridges.

Advantageous Effects

Based on the above-described development cartridge and the electrophotographic image forming apparatus using the same, according to embodiments, since a photosensitive drum and other rollers of the development cartridge are individually power-connected to a main body, rotation uniformity of the photosensitive drum may be increased. In addition, since a developer roller and other rollers of the development cartridge are individually power-connected to the main body, rotation uniformity of the developer roller may be increased.

MODE OF THE EMBODIMENTS

Figure 1:
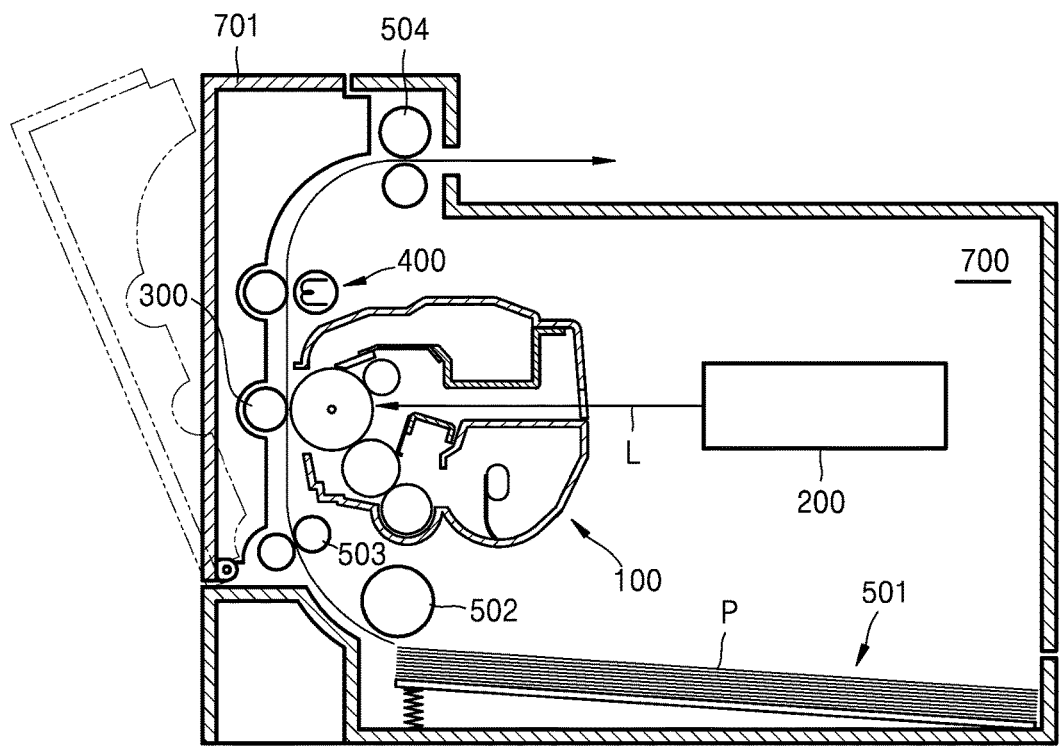
FIG. 1 is a structural view of an electrophotographic image forming apparatus according to an embodiment.

Reference will now be made in detail to embodiments, examples of which are illustrated in the accompanying drawings, wherein like reference numerals refer to like elements throughout.

Figure 2:
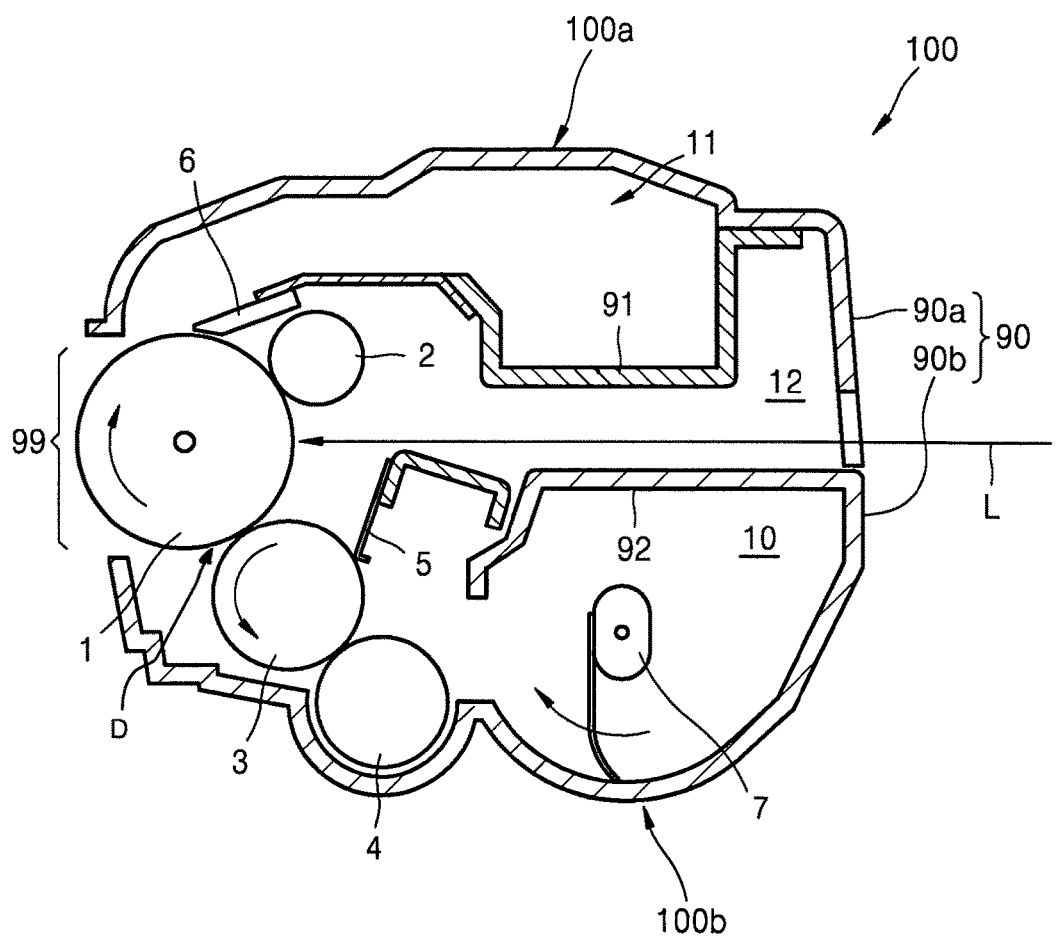
FIG. 2 is a structural view of a development cartridge used in the electrophotographic image forming apparatus illustrated in FIG. 1, according to an embodiment.

FIG. 1 is a structural view of an electrophotographic image forming apparatus according to an embodiment. FIG. 2 is a structural view of a development cartridge 100 used in the electrophotographic image forming apparatus illustrated in FIG. 1, according to an embodiment. The development cartridge 100 of the current embodiment is an integrated development cartridge including a photosensitive drum 1 and a developer roller 3.

Referring to FIGS. 1 and 2, the photosensitive drum 1 is an example of a photosensitive medium configured to form an electrostatic latent image thereon, and may include a cylindrical metal pipe and a photosensitive layer having photoconductivity on the outer circumference of the cylindrical metal pipe. The charging roller 2 is an example of a charger for charging a surface of the photosensitive drum 1 to a uniform potential. A charging bias voltage is applied to the charging roller 2. A corona charger (not shown) may be used instead of the charging roller 2. The developer roller 3 is used to develop the electrostatic latent image formed on the surface of the photosensitive drum 1, by supplying a toner to the electrostatic latent image. When a development bias voltage is applied to the developer roller 3, the toner on the surface of the developer roller 3 moves and is adhered to the electrostatic latent image formed on the surface of the photosensitive drum 1. The developer roller 3 may be in contact with the photosensitive drum 1 to form a development nip or be spaced apart from the photosensitive drum 1 by a development gap.

The development cartridge 100 may further include a supply roller 4 configured to adhere the toner to the developer roller 3. A supply bias voltage may be applied to the supply roller 4 to adhere the toner to the developer roller 3. Reference numeral 5 denotes a regulating member configured to regulate the amount of the toner adhered to the surface of the developer roller 3. The regulating member 5 may be, for example, a regulating blade having an end in contact with the developer roller 3 at a certain pressure. Reference numeral 6 denotes a cleaning member configured to remove a residual toner and a foreign substance from the surface of the photosensitive drum 1 before a charging operation. The cleaning member 6 may be, for example, a cleaning blade having an end in contact with the surface of the photosensitive drum 1. In the following description, the residual toner and the foreign substance removed from the surface of the photosensitive drum 1 are referred to as a waste toner.

The development cartridge 100 includes a toner container 10 and a waste toner container 11. The waste toner removed from the surface of the photosensitive drum 1 is contained in the waste toner container 11. The toner is contained in the toner container 10. An agitator 7 is mounted in the toner container 10. The agitator 7 serves to transport the toner to the developer roller 3. The agitator 7 may also serve to charge the toner to a certain potential by agitating the toner. Although a single agitator 7 is illustrated in FIG. 2, the scope of the present disclosure is not limited thereto. An appropriate number of agitators 7 may be mounted at appropriate positions in the toner container 10 to effectively supply the toner to the developer roller 3 in consideration of the volume and shape of the toner container 10. The agitator 7 may have a shape in which one or more flexible film-type stirring wings are provided on a rotation shaft. Alternatively, although not shown in FIGS. 1 and 2, the agitator 7 may be an auger having a spiral stirring wing. The agitator 7 transports the toner to the developer roller 3 and tribocharges the toner by agitating the toner.

Referring to FIG. 2, a housing 90 configures the toner container 10 and the waste toner container 11, and serves as a frame supporting elements of the development cartridge 100, e.g., the photosensitive medium 1, the charging roller 2, the developer roller 3, the supply roller 4, and the agitator 7. A part of the outer circumference of the photosensitive drum 1 is exposed outside the housing 90 through an opening 99. The housing 90 may include a first frame 90a and a second frame 90b.

The development cartridge 100 may include a first unit 100a and a second unit 100b. The first unit 100a may include the photosensitive drum 1, the charging roller 2, the cleaning member 6, and the first frame 90a supporting the photosensitive drum 1, the charging roller 2, and the cleaning member 6. The waste toner container 11 is provided in the first frame 90a. The second unit 100b may include the developer roller 3, the supply roller 4, the regulating member 5, the agitator 7, and the second frame 90b supporting the developer roller 3, the supply roller 4, the regulating member 5, and the agitator 7. The toner container 10 is provided in the second frame 90b. A lower wall 91 of the first frame 90a is spaced apart from an upper wall 92 of the second frame 90b, and an optical path 12 of light L irradiated from an exposure device 200 (see FIG. 1) to expose the photosensitive drum 1 is provided therebetween. However, the scope of the present disclosure is not limited thereto, and the first and second frames 90a and 90b may be integrated with each other.

Referring to FIG. 1, the development cartridge 100 is attached to a main body 700 of the image forming apparatus by opening a door 701. When the development cartridge 100 is attached to the main body 700, a driver (not shown) provided in the main body 700 is connected to the development cartridge 100 and drives the elements of the development cartridge 100, e.g., the photosensitive medium 1, the charging roller 2, the developer roller 3, the supply roller 4, and the agitator 7.

The exposure device 200 irradiates light modulated based on image information, to the surface of the photosensitive drum 1 charged to a uniform potential. As the exposure device 200, for example, a laser scanning unit (LSU) which deflects light emitted from a laser diode to a main scanning direction by using a polygon mirror and scans the light to the photosensitive drum 1 may be used.

The transfer roller 300 is an example of a transferer located to face the surface of the photosensitive drum 1 and to form a transfer nip. A transfer bias voltage for transferring a toner image developed on the surface of the photosensitive drum 1, to a recording medium P is applied to the transfer roller 300. A corona transferer may be used instead of the transfer roller 300.

The toner image transferred to the surface of the recording medium P by the transfer roller 300 is retained on the surface of the recording medium P due to electrostatic attraction. A fixing device 400 fixes the toner image on the recording medium P by applying heat and pressure to the toner image, thereby forming a permanent printed image on the recording medium P.

An image forming process based on the above-described configuration will now be briefly described. A charging bias voltage is applied to the charging roller 2, and the photosensitive drum 1 is charged to a uniform potential. The exposure device 200 irradiates light modulated to correspond to image information, to the photosensitive drum 1 through the optical path 12 provided in the development cartridge 100, and forms an electrostatic latent image on the surface of the photosensitive drum 1. A toner is transported by the agitator 7 toward the supply roller 4, and the supply roller 4 adheres the toner to the surface of the developer roller 3. The regulating member 5 forms a toner layer having a uniform thickness on the surface of the developer roller 3. A development bias voltage is applied to the developer roller 3. As the developer roller 3 rotates, the toner transported to a development nip D moves and is adhered to the electrostatic latent image formed on the surface of the photosensitive drum 1, due to a development bias voltage, and a visible toner image is formed on the surface of the photosensitive drum 1. The recording medium P taken out of a tray 501 by a pickup roller 502 is transported by transport rollers 503 to a transfer nip where the transfer roller 300 faces the photosensitive drum 1. When a transfer bias voltage is applied to the transfer roller 300, the toner image is transferred to the recording medium P due to electrostatic attraction. The toner image transferred to the recording medium P is fixed on the recording medium P by receiving heat and pressure from the fixing device 400, thereby completing a print operation. The recording medium P is discharged by a discharging roller 504. Residual toner not transferred to the recording medium P but remaining on the surface of the photosensitive drum 1 is removed by the cleaning member 6, and is contained in the waste toner container 11.

When the development cartridge 100 is attached to the main body 700, rotating elements in the development cartridge 100, e.g., the photosensitive drum 1 and the developer roller 3, rotate by receiving driving force from a driver (not shown) provided in the main body 700.

For example, a structure in which the photosensitive drum 1 is connected to the driver of the main body 700 and the photosensitive drum 1 and the developer roller 3 are interconnected based on a gear connection structure may be considered. Based on the gear connection structure, a $1^{st}$ gear and a $2^{nd}$ gear are connected to rotation shafts of the photosensitive drum 1 and the developer roller 3, respectively, and engage with each other. In the above-described structure in which the photosensitive drum 1 and the developer roller 3 are interconnected based on the gear connection structure, rotation uniformity of the photosensitive drum 1 may be influenced by the developer roller 3. That is, rotation uniformity of the photosensitive drum 1 is influenced by manufacturing precision of the $1^{st}$ gear and the $2^{nd}$ gear, support precision of the developer roller 3 by the second frame 90b, etc. Rotation uniformity of the photosensitive drum 1 greatly influences image quality.

To solve the above problem, according to the current embodiment, the photosensitive drum 1 is separate from the developer roller 3 in power. That is, the photosensitive drum 1 and the developer roller 3 are individually connected to the driver provided in the main body 700. In addition, the photosensitive drum 1 is connected to the driver of the main body 700 based on a shaft connection structure other than a gear connection structure.

Figure 3:
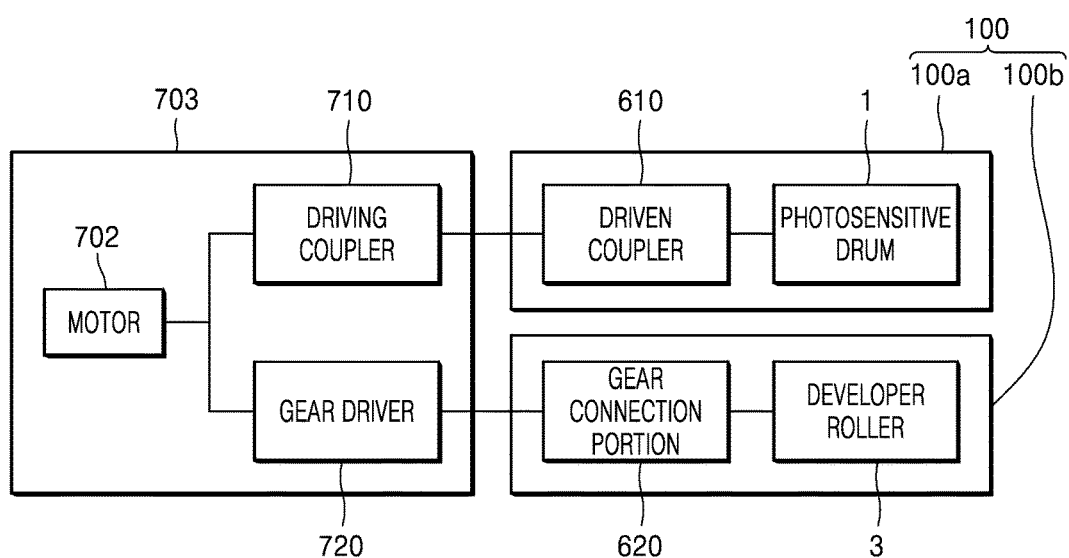
FIG. 3 is a block diagram of a power connection structure according to an embodiment.

FIG. 3 is a block diagram of a power connection structure according to an embodiment. Referring to FIG. 3, a driver 703 is provided in the main body 700. The driver 703 includes a driving coupler 710 and a gear driver 720. The driving coupler 710 and the gear driver 720 are driven by at least one motor 702. A driven coupler 610 and a gear connection portion 620 are provided in the development cartridge 100. When the development cartridge 100 is attached to the main body 700, the driving coupler 710 is connected to the driven coupler 610, and the gear driver 720 is connected to the gear connection portion 620.

Figure 4:
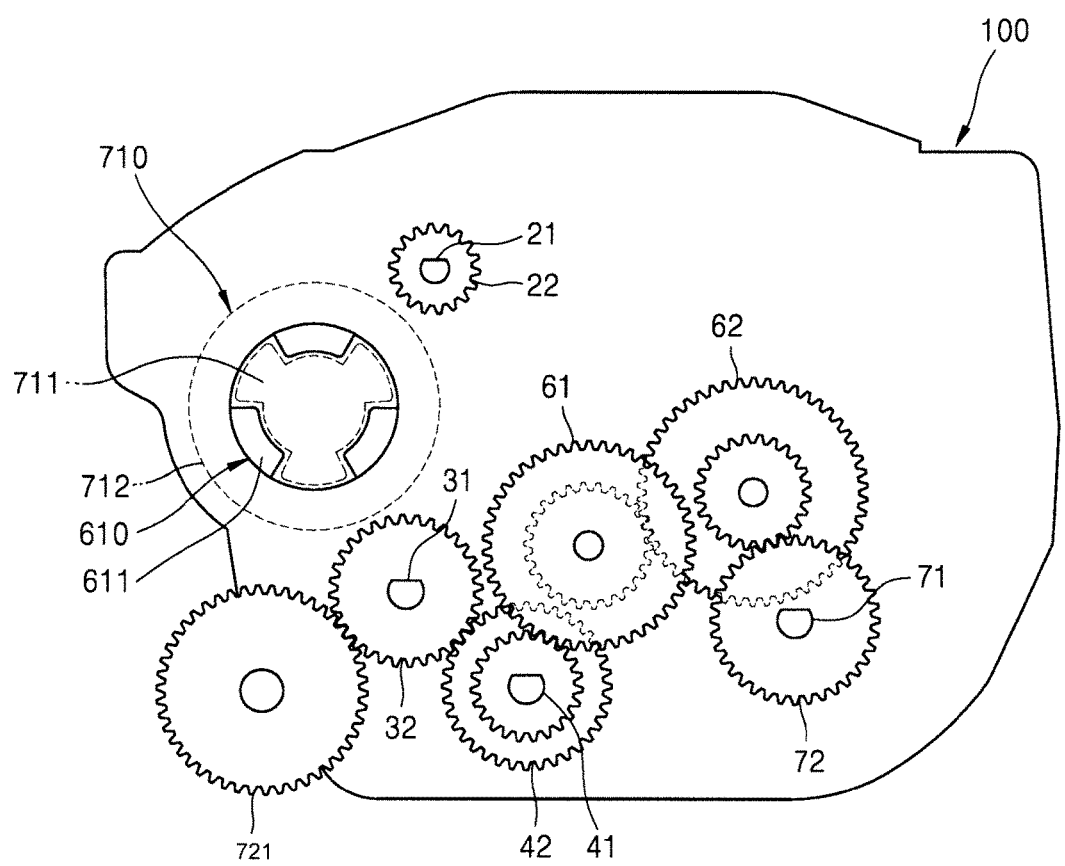
FIG. 4 is a schematic view of a power connection structure according to an embodiment.

FIG. 4 is a schematic view of the power connection structure according to an embodiment. Referring to FIGS. 3 and 4, the driving coupler 710 is connected to the driven coupler 610 based on a shaft connection structure. The driven coupler 610 is provided at an end of the photosensitive drum 1. The driving coupler 710 has a complementary shape capable of engaging with the driven coupler 610 in an axial direction.

The gear connection portion 620 is connected to the gear driver 720 based on a gear connection structure. For example, the gear connection portion 620 may include a developer roller gear 32 provided on a rotation shaft 31 of the developer roller 3, and the gear driver 720 may include a driving gear 721 rotated by the motor 702 and engaging with the developer roller gear 32. The supply roller 4 and the agitator 7 rotate in connection with the developer roller 3. For example, a supply roller gear 42 engaging with the developer roller gear 32 is provided on a rotation shaft 41 of the supply roller 4. An agitator gear 72 is provided on a rotation shaft 71 of the agitator 7. The agitator gear 72 is connected to the supply roller gear 42 through idle gears 61 and 62.

When the development cartridge 100 is attached to the main body 700, the driving coupler 710 engages with the driven coupler 610, and the driving gear 721 engages with the developer roller gear 32. When the motor 702 is driven, the photosensitive drum 1 and the developer roller 3 may rotate. The supply roller 4 and the agitator 7 may rotate in connection with the developer roller 3. Therefore, the photosensitive drum 1 is directly connected to the driver 703 based on a shaft connection method other than a gear connection method. The shaft connection method refers to a method of directing connecting a shaft to a shaft, and may ensure higher rotation uniformity compared to the gear connection method. In addition, since a gear which receives driving force is not connected to the photosensitive drum 1, jitters due to the gear may be prevented and thus rotation uniformity of the photosensitive drum 1 may be stably ensured. Furthermore, since thrust due to the gear is not generated, position stability of the development cartridge 100 inside the main body 700 may be increased. Since the developer roller 3 is connected to a large number of rotating elements, e.g., the supply roller 4 and the agitator 7, when the photosensitive drum 1 is directly connected to the developer roller 3 based on a gear connection method, rotation uniformity of the rotating elements may influence rotation uniformity of the photosensitive drum 1. According to the current embodiment, since the photosensitive drum 1 is separate from the developer roller 3 in power, influence of the developer roller 3 and the rotating elements connected to the developer roller 3, on rotation uniformity of the photosensitive drum 1 may be prevented.

The charging roller 2 may be in friction contract with the photosensitive drum 1 and rotate together with the photosensitive drum 1. A charging roller gear 22 may be provided on a rotation shaft 21 of the charging roller 2, and a gear (not shown) engaging with the charging roller gear 22 may be provided on a rotation shaft of the photosensitive drum 1.

Figure 5:
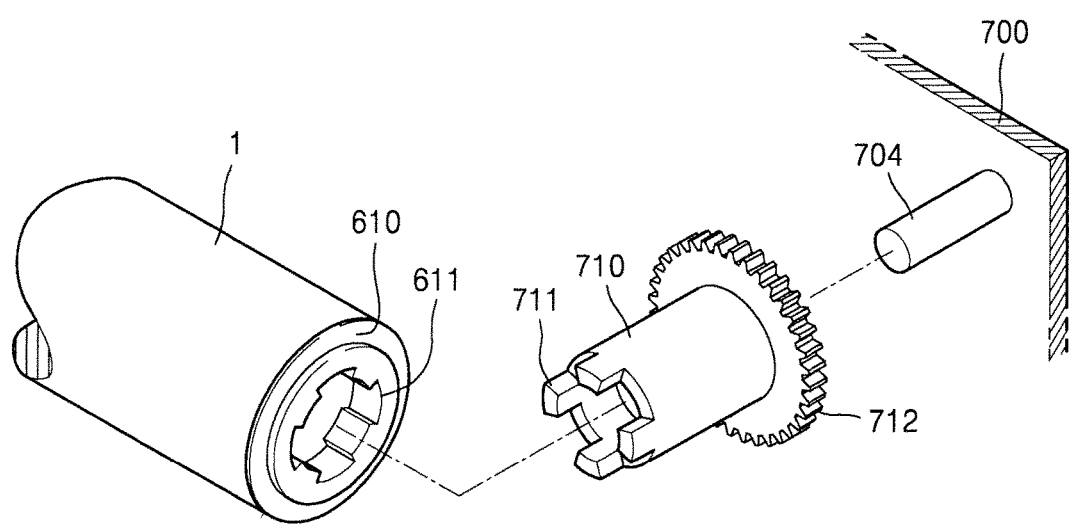
FIG. 5 is a perspective view of a driving coupler and a driven coupler according to an embodiment.

FIG. 5 is a perspective view of the driving coupler 710 and the driven coupler 610 according to an embodiment. Referring to FIG. 5, the driving coupler 710 is slidably supported by a supporting shaft 704 provided in the main body 700, in an axial direction. The driving coupler 710 includes a gear portion 712 connected to the motor 702, and a first coupling portion 711. The driven coupler 610 is coupled to an end of the photosensitive drum 1. The driven coupler 610 includes a second coupling portion 611 having a complementary shape capable of being coupled to the first coupling portion 711 in an axial direction. In the current embodiment, the first coupling portion 711 has a convex shape and the second coupling portion 611 has a concave shape. However, alternatively, the first coupling portion 711 may have a concave shape and the second coupling portion 611 may have a convex shape. The first and second coupling portions 711 and 611 may be coupled to each other in various shapes capable of rotating the driven coupler 610 together with the driving coupler 710. For example, the first coupling portion 711 may have a convex or concave polygonal shape and the second coupling portion 611 may have a concave or convex polygonal shape.

The driving coupler 710 may be guided by the supporting shaft 704 and slide from a first position spaced apart from the driven coupler 610, to a second position connected to the driven coupler 610. The driving coupler 710 may move to the first and second positions in various manners.

For example, the driving coupler 710 may move to the first or second position in association with an attachment or detachment operation of the development cartridge 100. When the development cartridge 100 is detached from the main body 700, the driving coupler 710 is located at the first position. When the development cartridge 100 is attached to the main body 700, an actuating member (not shown), which moves in an axial direction of the supporting shaft 704, may push the driving coupler 710 toward the second position due to the attachment operation of the development cartridge 100. As such, when the development cartridge 100 is completely attached, the driving coupler 710 may be located at the second position and be connected to the driven coupler

610. When the development cartridge 100 is detached from the main body 700, the actuating member may operate in an opposite direction to move the driving coupler 710 from the second position to the first position.

As another example, the actuating member may operate in association with an opening or closing operation of the door 701. For example, the actuating member is connected to the door 701. When the door 701 is open, the actuating member may move the driving coupler 710 from the second position to the first position. When the door 701 is closed, the actuating member may move the driving coupler 710 from the first position to the second position.

As another example, a position switching mechanism (not shown) configured to move the driving coupler 710 to the first and second positions may be provided in the main body 700. The position switching mechanism may be driven by the motor 702 configured to drive the driving coupler 710, or another motor. The position switching mechanism may locate the driving coupler 710 at the first position when an image forming operation is not performed, and locate the driving coupler 710 at the second position when an image forming operation is performed. The position switching mechanism may detect an open or closed state of the door 701, and move the driving coupler 710 to the first or second position based on the detection result. For example, the position switching mechanism may locate the driving coupler 710 at the first position when the door 701 is open, and locate the driving coupler 710 at the second position when the door 701 is closed. The position switching mechanism may move the driving coupler 710 to the first or second position based on a rotation direction of the motor 702. For example, the position switching mechanism may move the driving coupler 710 from the first position to the second position when the motor 702 rotates in a forward direction, i.e., in a rotation direction for image forming, and move the driving coupler 710 from the second position to the first position when the motor 702 rotates in a reverse direction.

The photosensitive drum 1 is rotatably supported by both side walls of the housing 90. Bearing members are interposed between the photosensitive drum 1 and the both side walls. To reduce the number of parts of the development cartridge 100 and man hours taken to produce the development cartridge 100, the driven coupler 610 may be integrated with the bearing members.

Figure 6:
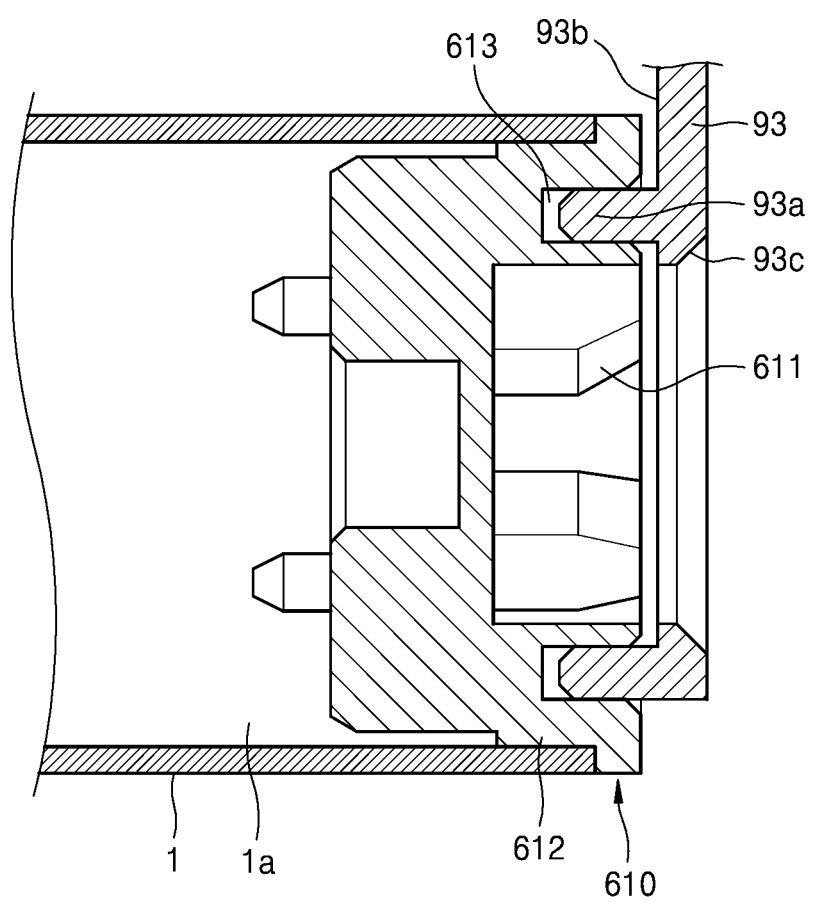
FIG. 6 is a cross-sectional view of a driven coupler according to an embodiment.

FIG. 6 is a cross-sectional view of the driven coupler 610 according to an embodiment. Referring to FIG. 6, the photosensitive drum 1 has a cylinder shape having a hollow 1a. The driven coupler 610 is coupled to an end of the photosensitive drum 1. The driven coupler 610 includes the second coupling portion 611, an insertion portion 612 inserted into the hollow 1a, and a bearing portion 613. For example, the insertion portion 612 is pressed into the hollow 1a. As such, the driven coupler 610 is fixed to an end of the photosensitive drum 1. The second coupling portion 611 is located at an inner side of the insertion portion 612 in a radius direction. The bearing portion 613 is provided at an outer side of the second coupling portion 611 in the radius direction. The bearing portion 613 is supported by a side wall 93 of the housing 90. The side wall 93 may be integrated with, for example, the housing 90, and may be a side bracket coupled to the housing 90. In the following description, the side wall 93 is referred to as a side bracket 93.

The bearing portion 613 of the current embodiment has an annular and concave groove shape. A cylindrical supporting portion 93a inserted into the bearing portion 613 is provided on the side bracket 93. The supporting portion 93a protrudes inward from an inner wall 93b of the side bracket 93 and is inserted into the bearing portion 613. As such, the photosensitive drum 1 may be rotatably supported by the side wall 93. A connection hole 93c through which the driving coupler 710 is connected to the driven coupler 610 is provided in the side bracket 93.

The driven coupler 610 may be, for example, a metal sintering member. The driven coupler 610 may be impregnated with oil. The side bracket 93 and the driven coupler 610 may be made of high-strength plastic such as polyphenylene sulfide (PPS) resin.

Figure 7:
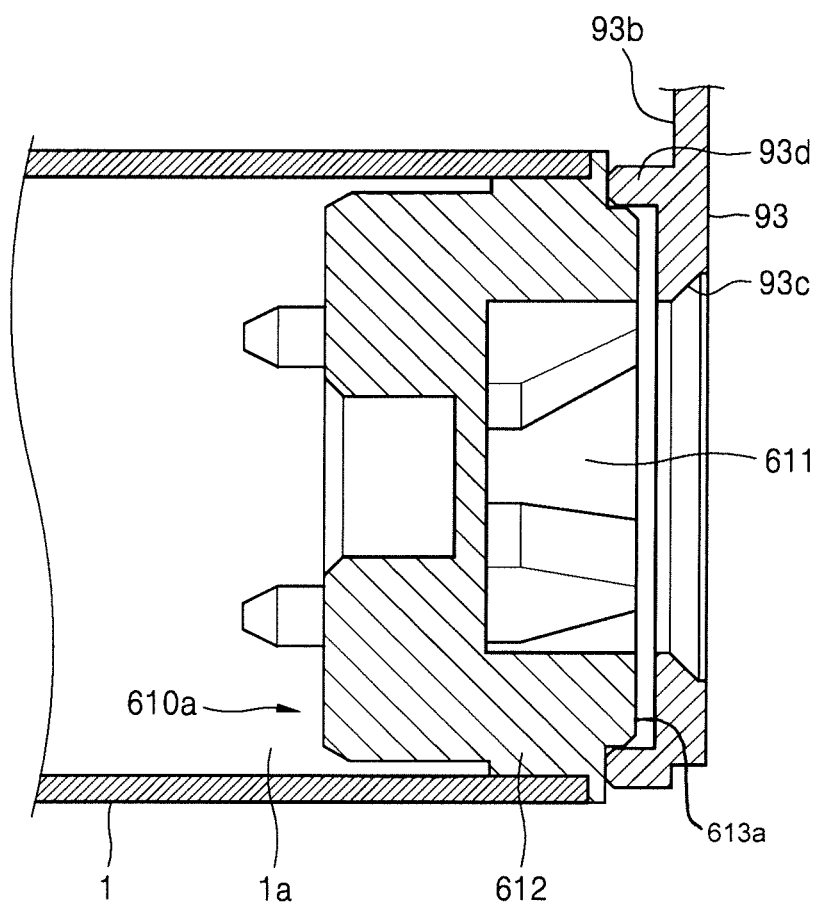
FIG. 7 is a cross-sectional view of a driven coupler according to another embodiment.

FIG. 7 is a cross-sectional view of a driven coupler 610a according to another embodiment. The driven coupler 610a of the current embodiment differs from the driven coupler 610 of FIG. 6 in that the driven coupler 610a includes a bearing portion 613a having a convex shape. The insertion portion 612 is pressed into the hollow 1a, and thus the driven coupler 610 is fixed to an end of the photosensitive drum 1. The bearing portion 613a has a cylindrical protrusion shape. A cylindrical supporting portion 93d configured to rotatably support the bearing portion 613a inserted thereinto is provided in the side bracket 93. The supporting portion 93d protrudes inward from the inner wall 93b of the side bracket 93. An outer diameter portion of the bearing portion 613a is inserted into and supported by an inner diameter portion of the supporting portion 93d. The connection hole 93c through which the driving coupler 710 is connected to the driven coupler 610 is provided in the side bracket 93.

Figure 8:
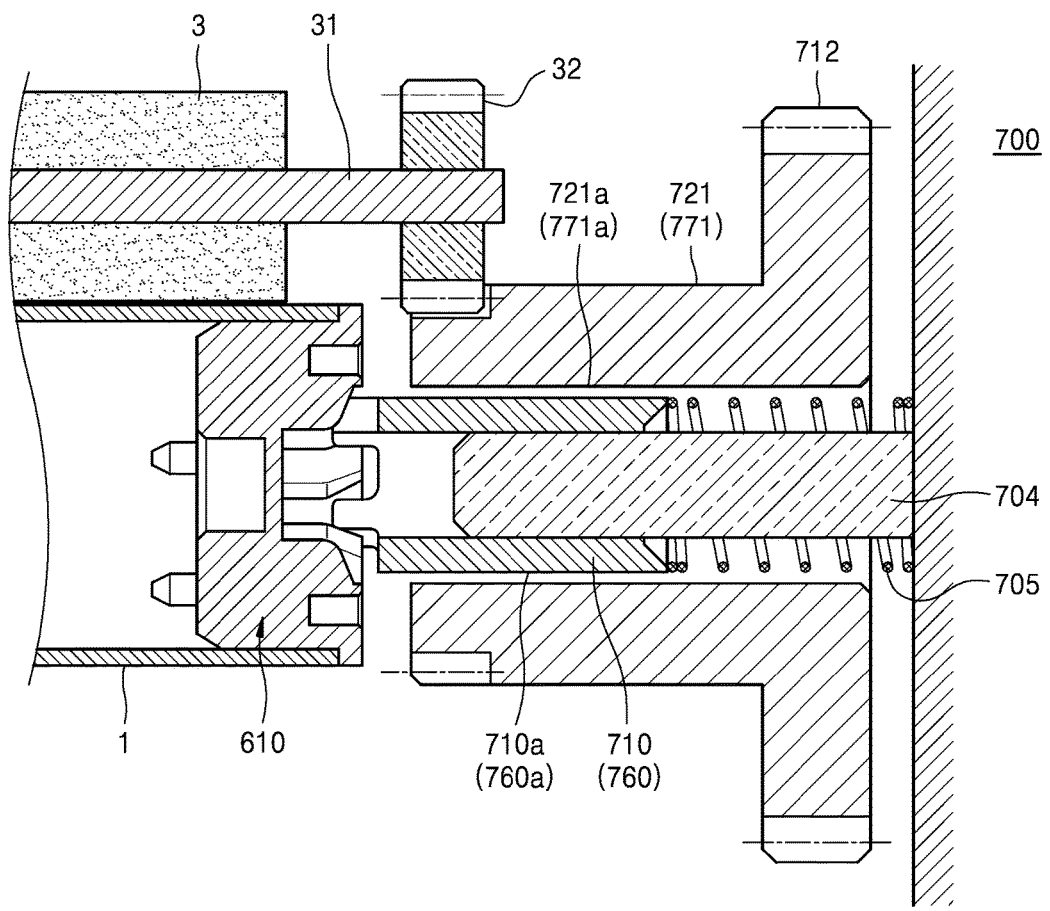
FIG. 8 is a cross-sectional view of a structure in which a driving coupler and a gear driver are coaxially provided, according to an embodiment.

The driving coupler 710 and the driving gear 721 for configuring the gear driver 720 may be coaxial. FIG. 8 is a cross-sectional view of a structure in which the driving coupler 710 and the gear driver 720 are coaxially provided, according to an embodiment. In FIG. 8, the shape of the development cartridge 100 is not illustrated.

Referring to FIG. 8, the driving coupler 710 is rotatably supported by the supporting shaft 704. The driving coupler 710 may slide in an axial direction of the supporting shaft 704. An elastic member 705 configured to apply elastic force in a direction in which the driving coupler 710 is connected to the driven coupler 610 may be further provided. The driving coupler 710 is inserted into an inner diameter portion 721a of the driving gear 721. The driving coupler 710 slides inside the inner diameter portion 721a in an axial direction of the supporting shaft 704. The driving gear 721 may be integrated with the gear portion 712. The gear portion 712 is connected to the motor 702 directly or by a power connection member such as a gear. Driving force of the motor 702 is transmitted through the gear portion 712 and the driving gear 721 to the driving coupler 710.

The inner diameter portion 721a of the driving gear 721 and an outer diameter portion 710a of the driving coupler 710 may have appropriate shapes in such a manner that the driving gear 721 and the driving coupler 710 may rotate together and that the driving coupler 710 may move in an axial direction of the supporting shaft 704. For example, cross-sections of the inner diameter portion 721a of the driving gear 721 and the outer diameter portion 710a of the driving coupler 710 may have polygonal shapes, D shapes, or the like. Alternatively, slots (not shown) extending in an axial direction of the supporting shaft 704 may be separately provided in the inner diameter portion 721a of the driving gear 721 and the outer diameter portion 710a of the driving coupler 710, pins (not shown) may be inserted into the slots, and thus the driving coupler 710 and the driving gear 721 may rotate together and the driving coupler 710 may move along the supporting shaft 704. The driving coupler 710 may be connected to the driving gear 721 based on various other structures.

Figure 9:
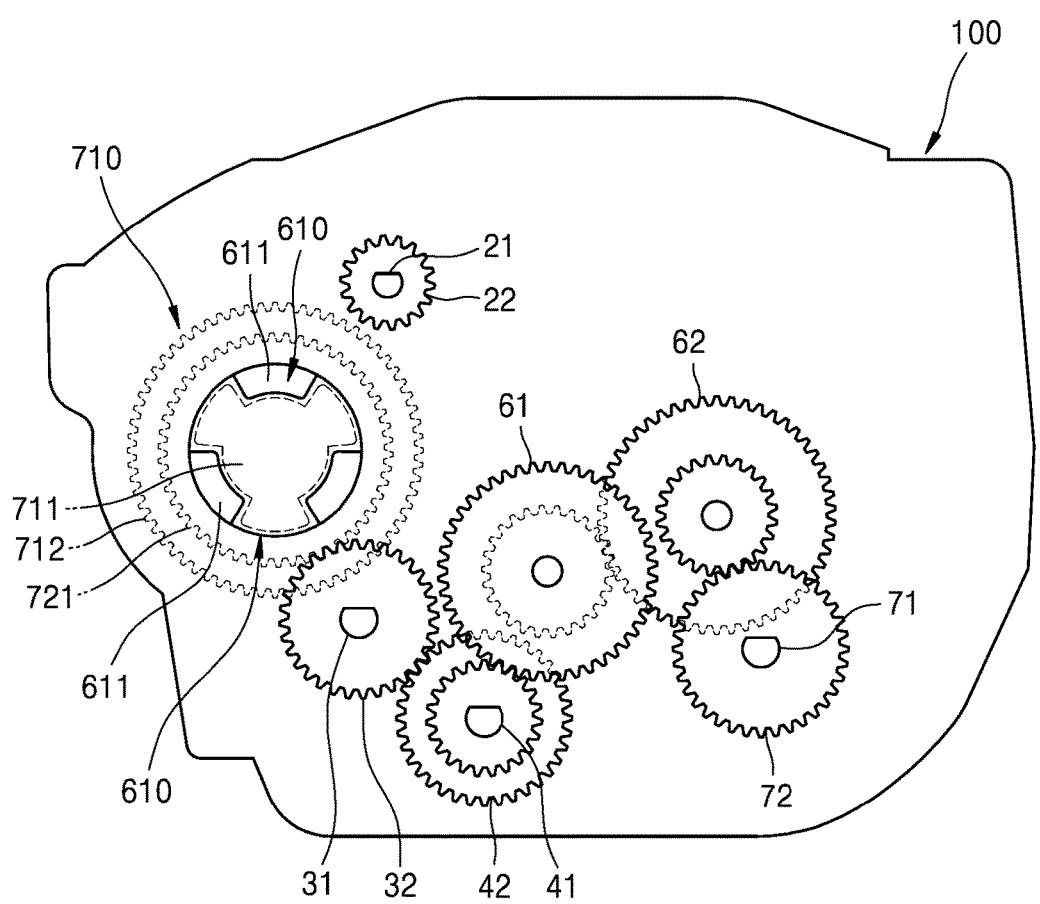
FIG. 9 is a schematic view of a power connection structure illustrated in FIG. 8, according to an embodiment.

FIG. 9 is a schematic view of a power connection structure according to an embodiment. Referring to FIG. 9, when the development cartridge 100 is attached to the main body 700, the driving gear 721 may engage with the developer roller gear 32 and, at the same time, the driving coupler 710 may be connected to the driven coupler 610. Therefore, the driver 703 provided in the main body 700 to drive the photosensitive drum 1 and the developer roller 3 may have a simple structure and have a compact size to occupy a small space in the main body 700.

Figure 10:
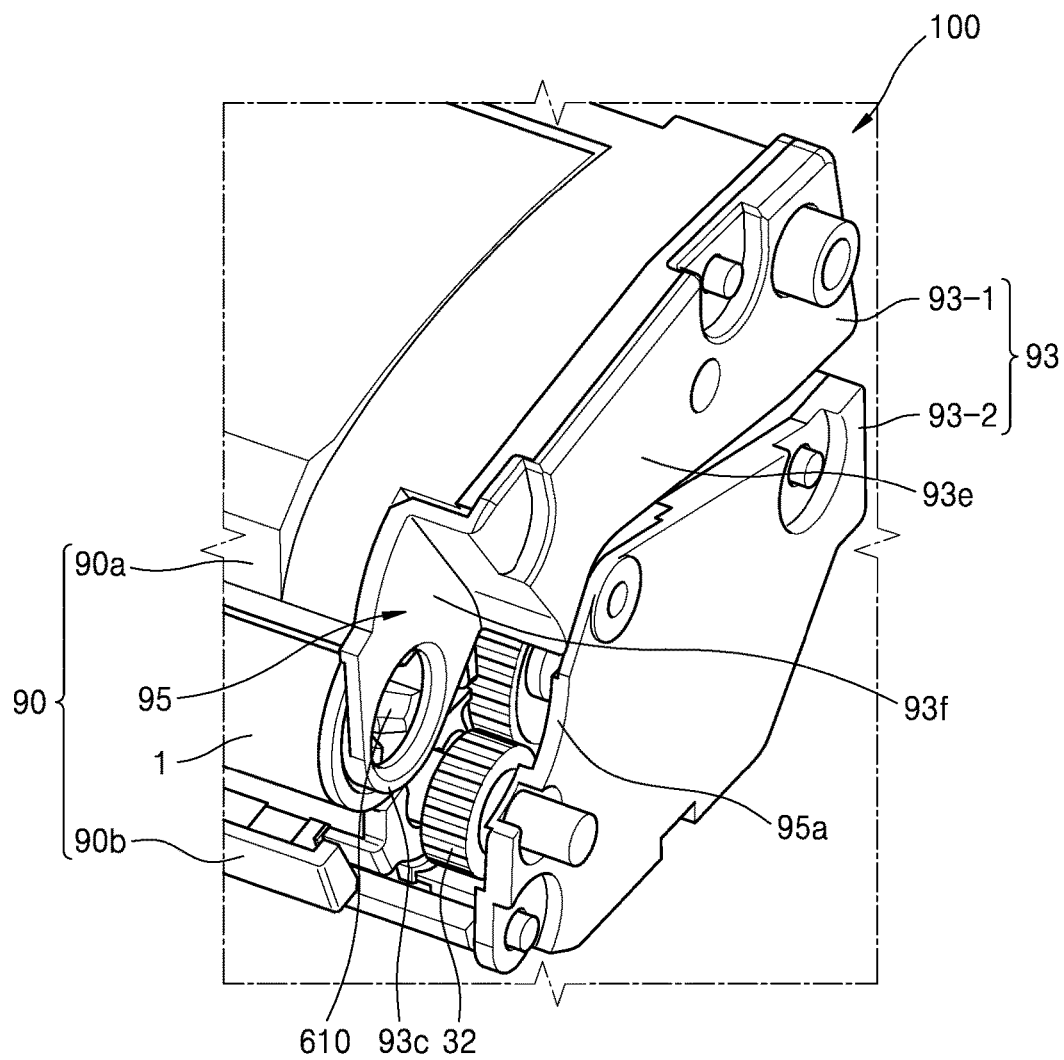
FIG. 10 is a partial perspective view of a development cartridge according to an embodiment.

FIG. 10 is a partial perspective view of the development cartridge 100 according to an embodiment. Referring to FIG. 10, an indentation 95 is provided in the side wall 93 of the housing 90. The side wall 93 may include a first side wall 93-1 located at a side of the first frame 90*a*, and a second side wall 93-2 located at a side of the second frame 90*b*. The first and second side walls 93-1 and 93-2 may be integrated with the first and second frames 90*a* and 90*b* and may also be referred to as first and second side brackets 93-1 and 93-2 coupled to the first and second frames 90*a* and 90*b*, respectively. Although the first and second side walls 93-1 and 93-2 are separate from each other in the current embodiment, the first and second side walls 93-1 and 93-2 may also be integrated with each other.

The indentation 95 is indented inward from an outer wall 93*e* of the side wall 93, i.e., in a length direction of the developer roller 3. The indentation 95 has a shape capable of accommodating the driving coupler 710 and the driving gear 721 when the development cartridge 100 is attached to the main body 700. An opening 95*a* configured to partially expose the developer roller gear 32 to the outside of the housing 90 is provided in the indentation 95.

For example, the side wall 93 includes the outer wall 93*e* and a stepped wall 93*f* stepped inward from the outer wall 93*e*. The indentation 95 may be implemented by the step between the outer wall 93*e* and the stepped wall 93*f*. The above-described cylindrical supporting portion 93*a* protrudes from the inner wall 93*b* (see FIG. 6) of the stepped wall 93*f* and is inserted into the bearing portion 613 (see FIG. 6) of the driven coupler 610. The connection hole 93*c* through which the driving coupler 710 is connected to the driven coupler 610 is provided in the stepped wall 93*f*. The opening 95*a* is provided between the outer wall 93*e* and the stepped wall 93*f* and exposes the developer roller gear 32 to the outside of the housing 90.

Figure 11:
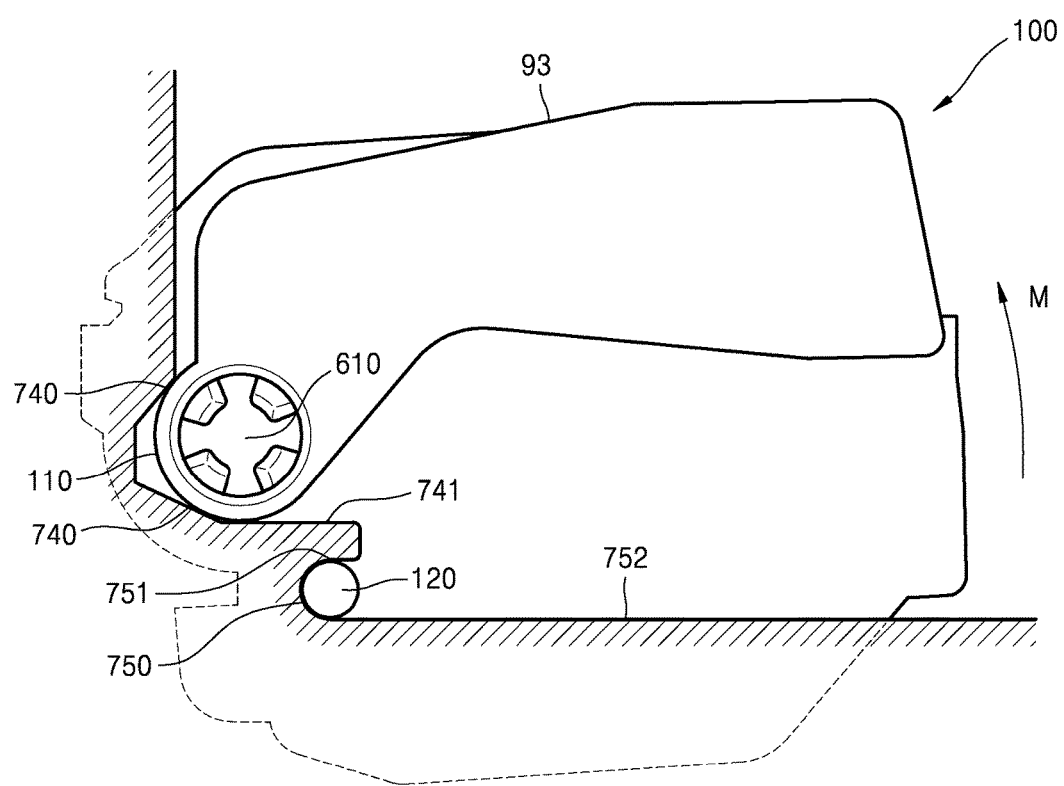
FIG. 11 is a schematic view of a position determination structure of a development cartridge, according to an embodiment.

The development cartridge 100 may have a position determination structure for determining the position thereof inside the main body 700. FIG. 11 is a schematic view of a position determination structure of the development cartridge 100, according to an embodiment. Referring to FIG. 11, a first position determiner 110 is provided on the development cartridge 100, and a first receiver 740 configured to accommodating the first position determiner 110 is provided in the main body 700. The first position determiner 110 and the first receiver 740 may determine the position of the photosensitive drum 1 inside the main body 700. Since the photosensitive drum 1 rotates, when the first position determiner 110 is provided on the photosensitive drum 1, the first receiver 740 configured to accommodate the first position determiner 110 should rotatably support the first position determiner 110 and thus the first receiver 740 may have a complex structure. In the current embodiment, the first position determiner 110 is located adjacent to the photosensitive drum 1. The first position determiner 110 may be provided on both side walls of the housing 90. For example, the first position determiner 110 is provided on the side brackets 93 configured to rotatably support the photosensitive drum 1. For example, the first position determiner 110 may have an arc shape coaxial with the photosensitive drum 1. The first receiver 740 supports the arc-shaped first position determiner 110 at two or more positions.

The development cartridge 100 may further include a second position determiner 120. A second receiver 750 configured to accommodate the second position determiner 120 is provided in the main body 700. The second position determiner 120 and the second receiver 750 determine the position of the developer roller 3 inside the main body 700. The first position determiner 110 may be provided on both side walls of the housing 90. For example, the second position determiner 120 may be the rotation shaft 31 of the developer roller 3, or may be a protrusion concentric with the rotation shaft 31 and protruding from the housing 90. When the developer roller 3 rotates, rotational force M is applied to the development cartridge 100 about the photosensitive drum 1 in a rotation direction of the developer roller 3. The second receiver 750 has a shape capable of supporting the second position determiner 120 to prevent rotation of the development cartridge 100. Referring to FIG. 11, the second receiver 750 includes a rotation preventing portion 751 configured to support the second position determiner 120 at a downstream side of the second position determiner 120 with respect to the rotation direction of the developer roller 3.

One or more guide rails configured to guide the development cartridge 100 when the development cartridge 100 is attached or detached may be provided in the main body 700. For example, in the current embodiment, first and second guide rails 741 and 752 may be provided in the main body 700. When the development cartridge 100 is attached to or detached from the main body 700, the first and second position determiners 110 and 120 are guided by the first and second guide rails 741 and 752, respectively. When the development cartridge 100 is attached to the main body 700, the first and second position determiners 110 and 120 are guided to the first and second receivers 740 and 750 by the first and second guide rails 741 and 752, respectively.

Based on the above-described configuration, when the development cartridge 100 is attached to the main body 700, the first and second position determiners 110 and 120 are accommodated in the first and second receivers 740 and 750, respectively. Then, as illustrated in FIG. 4, the driven coupler 610 and the driving coupler 710 are coaxially aligned, and the driving coupler 710 is connected to the driven coupler 610. In addition, the developer roller gear 32 engages with the driving gear 721. Since the first and second position determiners 110 and 120 are supported by the first and second receivers 740 and 750, respectively, the driving coupler 710 and the driven coupler 610 may be coaxially aligned to stably drive the photosensitive drum 1, and a center distance between the driving gear 721 and the developer roller gear 32 may be constantly maintained to stably transmit driving force of the driver 703 to the developer roller 3.

Although the integrated development cartridge 100 including the photosensitive drum 1 and the developer roller 3 is described in the above embodiments, the above-described power connection structure and the position determination structure may also be applied to a non-integrated development cartridge including the developer roller 3.

Figure 12:
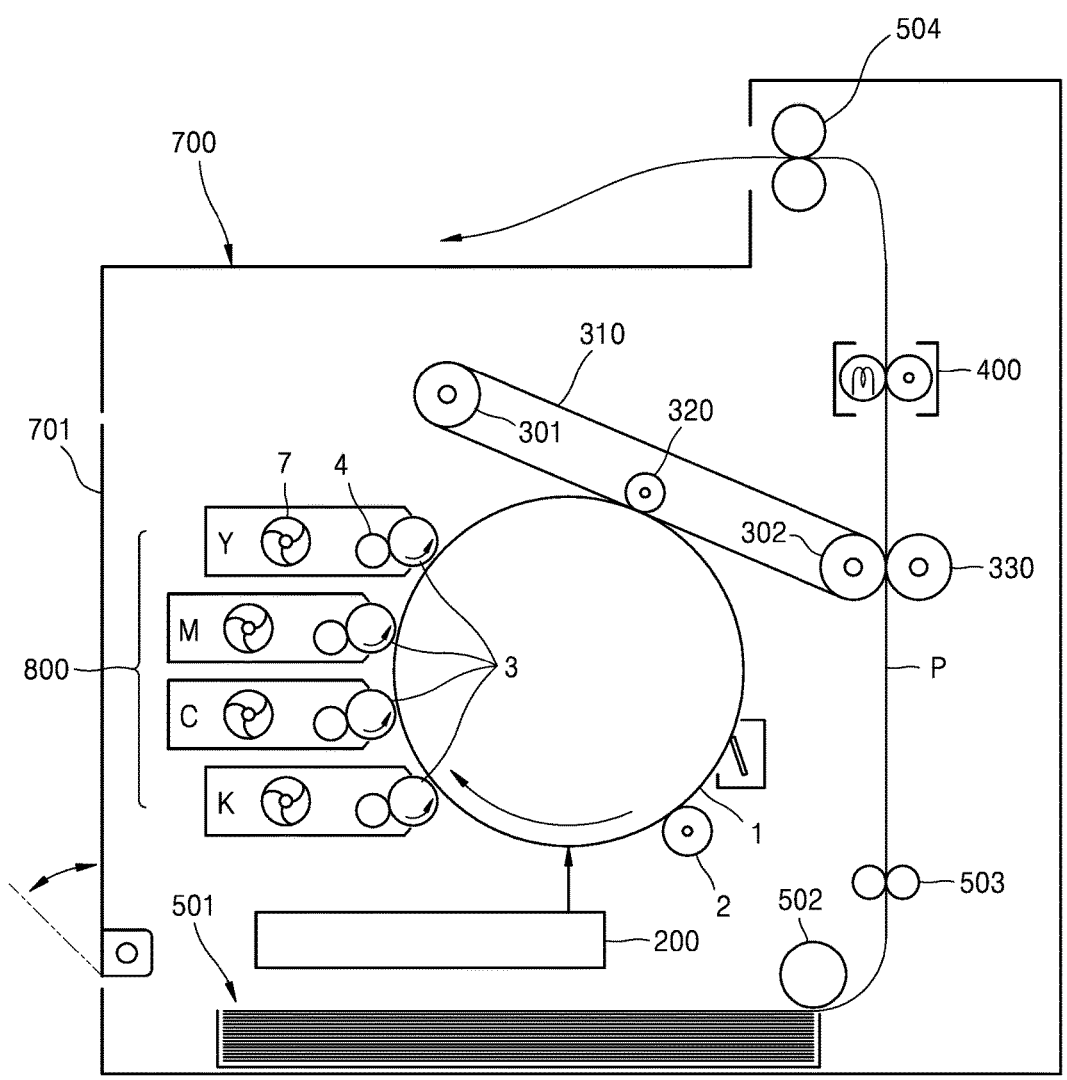
FIG. 12 is a structural view of an electrophotographic image forming apparatus according to another embodiment.

FIG. 12 is a structural view of an electrophotographic image forming apparatus according to another embodiment.

Figure 13:
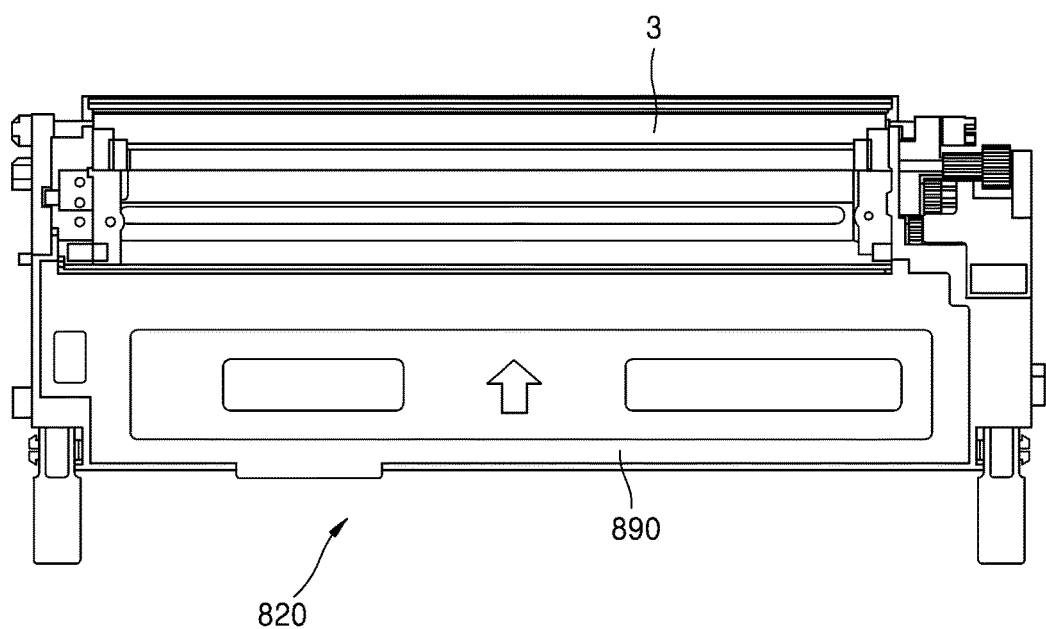
FIG. 13 is a plan view of a development cartridge according to another embodiment.

FIG. 13 is a plan view of development cartridges 800 according to another embodiment. Hereinafter, like reference numerals denote like elements in FIGS. 1 through 8.

Referring to FIG. 12, the image forming apparatus includes the photosensitive drum 1, the charging roller 2, the exposure device 200, the development cartridges 800, an intermediate transfer belt 310, a first transfer roller 320, a second transfer roller 330, and the fixing device 400. Each development cartridge 800 of the current embodiment is a non-integrated development cartridge including the developer roller 3.

The photosensitive drum 1 includes a cylindrical metal drum, and a photoconductive layer on the outer circumference of the cylindrical metal drum. A photosensitive belt (not shown) may be used instead of the photosensitive drum 1. The charging roller 2 is an example of a charger for charging the photosensitive drum 1 to a uniform potential. The charging roller 2 charges the outer circumferential surface of the photosensitive drum 1 to a uniform potential by supplying charges while rotating in or out of contact with the outer circumferential surface of the photosensitive drum 1. As a charger, a corona charger (not shown) may be used instead of the charging roller 2. The exposure device 200 irradiates light corresponding to image information, to the photosensitive drum 1 charged to have a uniform potential, thereby forming an electrostatic latent image. A laser scanning unit (LSU) using a laser diode as a light source may be used as the exposure device 200.

The image forming apparatus of the current embodiment uses cyan (C), magenta (M), yellow (Y), and black (K) toners to print a color image. In the following description, when an element needs to be identified per color, Y, M, C, or K is added to a reference numeral which denotes the element.

The image forming apparatus of the current embodiment includes four development cartridges 800 separately containing C, M, Y, and K toners. Referring to FIGS. 10 and 11, each development cartridge 800 includes the developer roller 3. The development cartridge 800 is located in such a manner that the developer roller 3 is spaced apart from the photosensitive drum 1 by a development gap, and performs a non-contact development operation. The development gap may be about several ten to several hundred microns. In addition to the developer roller 3, the development cartridge 800 may further include the supply roller 4 configured to supply a toner to the developer roller 3, and the agitator 7. The developer roller 3, the supply roller 4, and the agitator 7 are rotatably supported by a housing 890.

The intermediate transfer belt 310 is supported by support rollers 301 and 302 and travels at a linear velocity equal to the linear velocity at which the photosensitive drum 1 rotates. The length of the intermediate transfer belt 310 should be equal to or greater than a maximum length of the paper P usable by the image forming apparatus. The first transfer roller 320 faces the photosensitive drum 1, and a first transfer bias voltage for transferring a toner image developed on the photosensitive drum 1 to the intermediate transfer belt 310 is applied to the first transfer roller 320. The second transfer roller 330 is provided to face the intermediate transfer belt 310. The second transfer roller 330 is space apart from the intermediate transfer belt 310 while the toner image is being transferred from the photosensitive drum 1 to the intermediate transfer belt 310, and is in contact with the intermediate transfer belt 310 after the toner image is completely transferred to the intermediate transfer belt 310. A second transfer bias voltage for transferring the toner image to the paper P is applied to the second transfer roller 330.

An image forming process based on the above-described configuration will now be briefly described. Light corresponding to, for example, yellow (Y) image information is irradiated from the exposure device 200 to the photosensitive drum 1 charged to a uniform potential by the charging roller 2. An electrostatic latent image corresponding to the yellow (Y) image information is formed on the photosensitive drum 1. A development bias voltage is applied to the developer roller 3 of a yellow development cartridge 800Y. Then, a yellow (Y) toner is adhered to the electrostatic latent image and a yellow (Y) toner image is developed on the photosensitive drum 1. The yellow (Y) toner image is transferred to the intermediate transfer belt 310 due to a first transfer bias voltage applied to the first transfer roller 320. After the yellow (Y) toner image corresponding to a page is completely transferred, the exposure device 200 irradiates light corresponding to, for example, magenta (M) image information, to the photosensitive drum 1 recharged to a uniform potential by the charging roller 2, thereby forming an electrostatic latent image corresponding to the magenta (M) image information. A magenta development cartridge 800M develops the electrostatic latent image by supplying a magenta (M) toner to the electrostatic latent image. A magenta (M) toner image formed on the photosensitive drum 1 is transferred to the intermediate transfer belt 310 and is superposed on the previously transferred yellow (Y) toner image. The above-described operation is also performed for cyan (C) and black (K). Then, a color toner image in which yellow (Y), magenta (M), cyan (C), and black (K) toner images are superposed is formed on the intermediate transfer belt 310. This color toner image is transferred, due to a second transfer bias voltage, to the paper P passing between the intermediate transfer belt 310 and the second transfer roller 330. The fixing device 400 fixes the color toner image on the paper P by applying heat and pressure to the color toner image. Due to the above-described process, a multi-path color image forming apparatus using one photosensitive drum (or photosensitive medium) 1, the exposure device 200, and four development cartridges 800 may be implemented.

The development cartridges 800 may be attached to or detached from the main body 700 by opening the door 701. When the development cartridge 100 is attached to the main body 700, rotating elements (e.g., the developer roller 3) in each development cartridge 800 rotate by receiving driving force from a driver (not shown) provided in the main body 700.

For example, a structure in which the developer roller 3 is connected to the driver of the main body 700 and the developer roller 3, the supply roller 4, and the agitator 7 are interconnected based on a gear connection structure may be considered. Based on the gear connection structure, a $1^{st}$ gear, a $2^{nd}$ gear, and a $3^{rd}$ gear are connected to rotation shafts of the developer roller 3, the supply roller 4, and the agitator 7, respectively, and sequentially engage with each other. In the above-described structure, rotation uniformity of the developer roller 3 may be influenced by the supply roller 4 and the agitator 7. That is, rotation uniformity of the developer roller 3 is influenced by manufacturing precision of the $1^{st}$ gear 1, the $2^{nd}$ gear, and the $3^{rd}$ gear, support precision of the developer roller 3, the supply roller 4, and the agitator 7 by the housing 890, etc. Rotation uniformity of the developer roller 3 greatly influences image quality.

To solve the above problem, according to the current embodiment, the developer roller 3 is separate from the supply roller 4 and the agitator 7 in power. That is, the developer roller 3 is individually connected to the driver provided in the main body 700. In addition, the developer roller 3 is connected to the driver of the main body 700 based on a shaft connection structure other than a gear connection structure.

Figure 14:
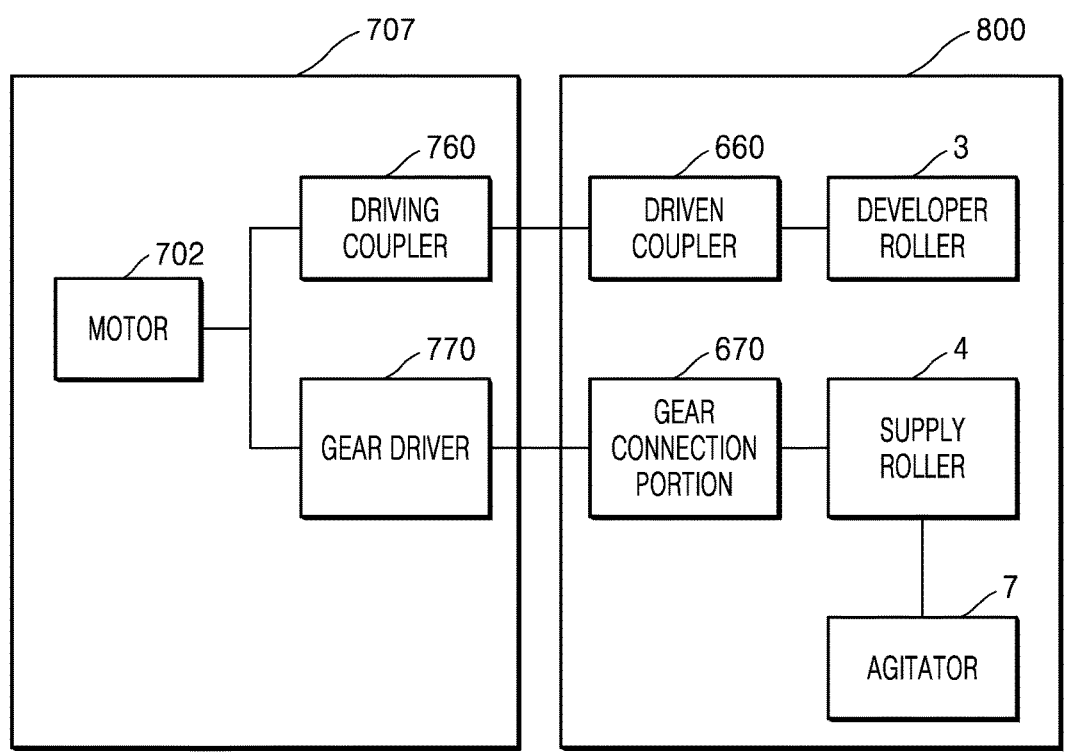
FIG. 14 is a block diagram of a power connection structure according to another embodiment.

FIG. 14 is a block diagram of a power connection structure according to another embodiment. Referring to FIG. 14, a driver 707 is provided in the main body 700. The driver 707 includes a driving coupler 760 and a gear driver 770. The driving coupler 760 and the gear driver 770 are driven by at least one motor 702. A driven coupler 660 and a gear connection portion 670 are provided in the development cartridge 800. When the development cartridge 800 is attached to the main body 700, the driving coupler 760 is connected to the driven coupler 660, and the gear driver 770 is connected to the gear connection portion 670. The gear connection portion 670 is connected to the gear driver 770 based on a gear connection structure.

Figure 15:
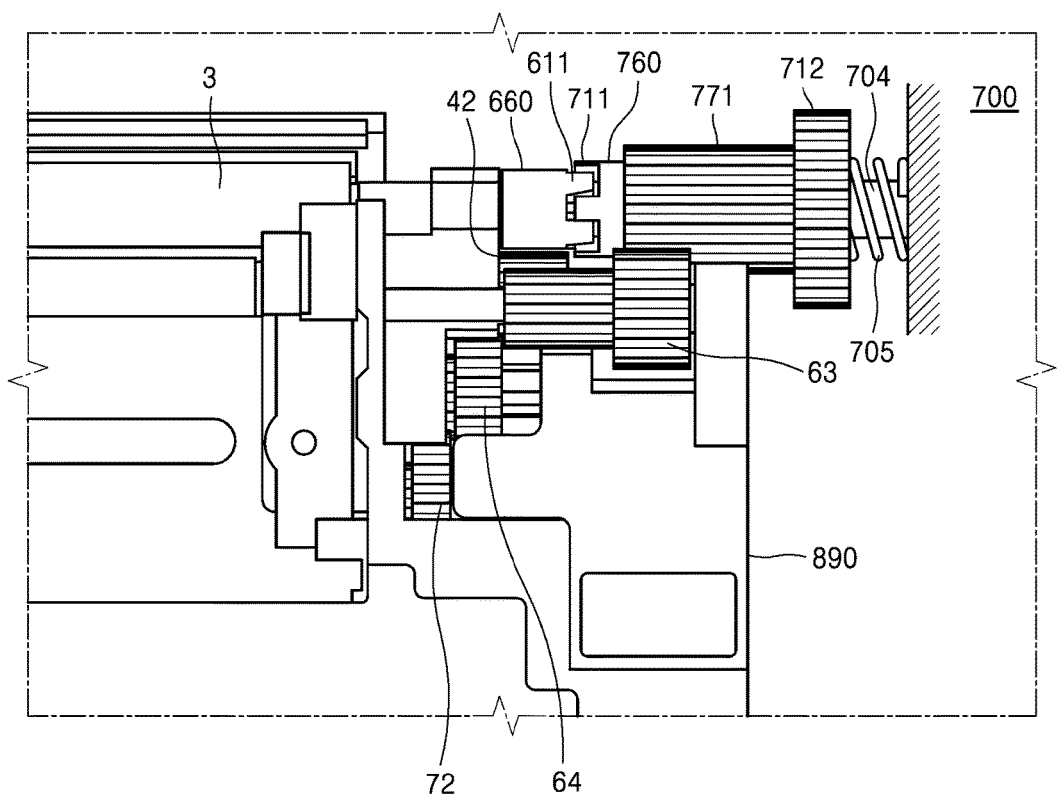
FIG. 15 is a schematic view of a power connection structure according to another embodiment.

FIG. 15 is a schematic view of the power connection structure according to another embodiment. Referring to FIGS. 13 to 15, the driving coupler 760 is connected to the driven coupler 660 based on a shaft connection method. The driven coupler 660 is provided at an end of the rotation shaft 31 of the developer roller 3. The driving coupler 760 has a complementary shape capable of engaging with the driven coupler 660 in an axial direction. The driving coupler 760 is slidably supported by the supporting shaft 704 provided in the main body 700, in an axial direction. The driving coupler 760 includes the gear portion 712 connected to the motor 702, and the first coupling portion 711. The driven coupler 660 includes the second coupling portion 611 having a complementary shape capable of being coupled to the first coupling portion 711 in an axial direction. When the development cartridge 800 is attached to the main body 700, the driving coupler 760 engages with the driven coupler 660 based on a shaft connection structure. Thus, the developer roller 3 is directly connected to the driver 707 based on a shaft connection method, and a gear is not connected to the developer roller 3. Therefore, influence of the supply roller 4 and the agitator 7 on rotation uniformity of the developer roller 3 may be reduced. In addition, since a gear is not connected to the developer roller 3, jitters due to the gear may be prevented and thus rotation uniformity of the developer roller 3 may be stably ensured. Furthermore, since thrust due to the gear is not generated, position stability of the development cartridge 800 inside the main body 700 may be increased.

The gear driver 770 may include a driving gear 771 provided in the main body 700. The gear connection portion 670 may include a connection gear 63 mounted in the housing 890 of the development cartridge 800. When the development cartridge 800 is attached to the main body 700, the connection gear 63 engages with the driving gear 771. The connection gear 63 is connected to the supply roller gear 42, and the agitator gear 72 is connected to the supply roller gear 42 through an idle gear 64.

The driving coupler 760 may have the structure illustrated in FIG. 5 or 8. When the driving coupler 760 has the same structure as the driving coupler 710 illustrated in FIG. 5, the driving gear 771 is mounted on a supporting shaft (not shown) different from the supporting shaft 704. The driving coupler 760 of the current embodiment has the structure illustrated in FIG. 8. That is, the driving coupler 760 is provided coaxially with the gear driver 770, i.e., the driving gear 771. Referring to FIGS. 8 and 13, the driving coupler 760 is rotatably supported by the supporting shaft 704. The driving coupler 760 may slide in an axial direction of the supporting shaft 704. The elastic member 705 configured to apply elastic force in a direction in which the driving coupler 760 is connected to the driven coupler 660 may be further provided. The driving coupler 760 is inserted into an inner diameter portion 771a of the driving gear 771. The inner diameter portion 771a of the driving gear 771 and an outer diameter portion 760a of the driving coupler 760 may have appropriate shapes in such a manner that the driving gear 771 and the driving coupler 760 may rotate together. The driving coupler 760 slides inside the inner diameter portion 771a in an axial direction of the supporting shaft 704. Driving force of the motor 702 is transmitted through the driving gear 771 to the driving coupler 760 and the connection gear 63. Based on the above-described configuration, when the development cartridge 800 is attached to the main body 700, the developer roller 3, the supply roller 4, and the agitator 7 may be driven by the driver 707.

As described above, the driving coupler 760 may be guided by the supporting shaft 704 and move to a first position spaced apart from the driven coupler 660 and a second position connected to the driven coupler 660 in association with an attachment operation of the development cartridge 800, in association with an opening or closing operation of the door 701, or by a position switching mechanism provided in the main body 700.

While one or more embodiments have been described with reference to the figures, it will be understood by those of ordinary skill in the art that various changes in form and details may be made therein without departing from the spirit and scope as defined by the following claims.

The invention claimed is:

1. A development cartridge attachable/detachable to/from a main body of an image forming apparatus, the development cartridge comprising:
   a photosensitive drum to form an electrostatic latent image on the photosensitive drum;
   a developer roller to develop the electrostatic latent image by supplying a developer to the photosensitive drum, the developer roller including a rotatable shaft;
   a housing to support the photosensitive drum and the developer roller;
   a developer roller gear provided on the rotatable shaft of the developer roller to connect to a driving gear of a driving coupler located coaxially with the driving gear in the main body when the development cartridge is attached to the main body; and
   a driven coupler provided at an end of the photosensitive drum to couple based on shaft coupling to the driving coupler located coaxially with the driving gear in the main body when the development cartridge is attached to the main body.

2. The development cartridge of claim 1, wherein an indentation in a side wall of the housing is provided in a length direction of the developer roller to accommodate the driving coupler and the driving gear when the development cartridge is attached to the main body.

3. The development cartridge of claim 2, wherein the indentation provides an opening to expose the developer roller gear to outside of the housing.

4. The development cartridge of claim 1, wherein the driven coupler allows the photosensitive drum to be rotatably supported by a side wall of the housing.

5. The development cartridge of claim 4, wherein the driven coupler comprises:

an insertion portion inserted into a hollow at the end of the photosensitive drum;
a second coupling portion having a complementary shape to a first coupling portion of the driving coupler; and
a bearing portion provided outside the second coupling portion in a radius direction, and supported by a supporting portion provided on the side wall to allow the photosensitive drum to be rotatably supported by the housing.

6. The development cartridge of claim 5, wherein the bearing portion has a concave groove shape, and
wherein the supporting portion is inserted into the bearing portion.

7. The development cartridge of claim 5, wherein the bearing portion has a convex cylinder shape, and
wherein the supporting portion has a cylinder shape to rotatably support the bearing portion inserted into the supporting portion.

8. The development cartridge of claim 5, wherein a connection hole through which the first coupling portion engages with the second coupling portion is provided in the side wall of the housing.

9. The development cartridge of claim 1, wherein a first position determiner being concentric with the photosensitive drum and having an arc shape, and a second position determiner being concentric with the developer roller are provided on both side walls of the housing.

10. An electrophotographic image forming apparatus comprising:
the main body; and
the development cartridge of claim 1, which is attachable/detachable to/from the main body.

11. The electrophotographic image forming apparatus of claim 10, wherein a first position determiner being concentric with the photosensitive drum and having an arc shape, and a second position determiner being concentric with the developer roller are provided on both side walls of the housing, and
wherein first and second receivers to respectively accommodate the first and second position determiners are provided in the main body.

12. The electrophotographic image forming apparatus of claim 11, wherein the second receiver comprises a rotation preventing portion to support the second position determiner at a downstream side of the second position determiner with respect to a rotation direction of the developer roller.

13. A development cartridge attachable/detachable to/from a main body of an image forming apparatus, the development cartridge comprising:
a developer roller to develop an electrostatic latent image by supplying a developer to a photosensitive drum to form the electrostatic latent image on the photosensitive drum; and
a driven coupler provided at an end of the developer roller to couple based on shaft coupling to a driving coupler located in the main body coaxially with the driven coupler, when the development cartridge is attached to the main body,
wherein the driven coupler includes,
an insertion portion inserted into a hollow at the end of the developer roller;
a second coupling portion coupled to an inner side of the insertion portion and having a complementary shape to a first coupling portion of the driving coupler; and
a bearing portion provided outside the second coupling portion in a radius direction.

14. An image forming apparatus, comprising:
a main body to accommodate an attachable/datable development cartridge that includes least one of a photosensitive drum or a developer roller, with a driven shaft coupler coupled to an end of the photosensitive drum or the developer roller;
a driving coupler located in the main body to couple based on shaft coupling to the driven shaft coupler coupled to the end of the at least one of the photosensitive drum or the developer roller in the attachable/datable development cartridge,
wherein the driven coupler includes,
an insertion portion inserted into a hollow at the end of the at least one of the photosensitive drum or the developer roller;
a second coupling portion coupled to an inner side of the insertion portion and having a complementary shape to a first coupling portion of the driving coupler; and
a bearing portion provided outside the second coupling portion in a radius direction.

15. A development cartridge attachable/detachable to/from a main body of an image forming apparatus, the development cartridge comprising:
a photosensitive drum to form an electrostatic latent image on the photosensitive drum;
a developer roller to develop the electrostatic latent image by supplying a developer to the photosensitive drum, the developer roller including a rotatable shaft and a developer roller gear provided on the rotatable shaft; and
a driven coupler provided at an end of the photosensitive drum to couple based on shaft coupling to a driving coupler located coaxially with a driving gear in the main body,
wherein the developer roller gear is to connect to the driving gear in the main body.

* * * * *

UNITED STATES PATENT AND TRADEMARK OFFICE
CERTIFICATE OF CORRECTION

PATENT NO. : 10,289,062 B2  
APPLICATION NO. : 15/909614  
DATED : May 14, 2019  
INVENTOR(S) : Young Chae Kim et al.

Page 1 of 1

It is certified that error appears in the above-identified patent and that said Letters Patent is hereby corrected as shown below:

On the Title Page

On page 2, Column 1, item (56), Foreign patent documents, Line 6, delete "102014006773" and insert -- 1020140067738 --, therefor.

On page 2, Column 1, item (56), Foreign patent documents, Line 7, delete "102015003913" and insert -- 1020150039139 --, therefor.

Signed and Sealed this
Twenty-third Day of July, 2019

Andrei Iancu
*Director of the United States Patent and Trademark Office*